Jan. 28, 1936.  M. H. SUSSIN  2,029,085
PRESSURE FLUID SUPPLY SYSTEM AND APPARATUS
Filed Dec. 26, 1931
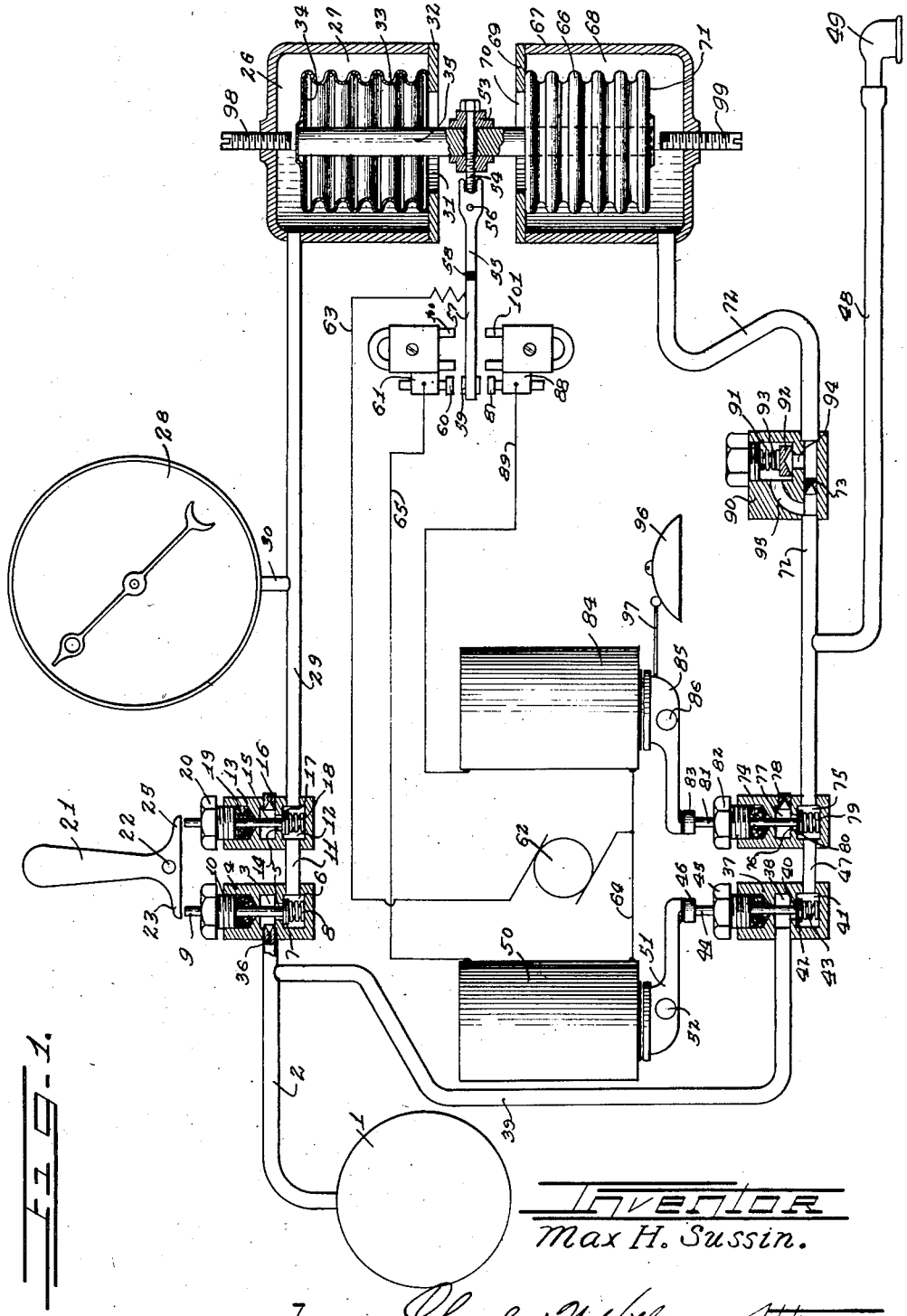
Inventor
Max H. Sussin.

Patented Jan. 28, 1936

2,029,085

UNITED STATES PATENT OFFICE 2,029,085

PRESSURE FLUID SUPPLY SYSTEM AND APPARATUS

Max H. Sussin, Chicago, Ill., assignor of one-half to Frank L. Barchard, Chicago, Ill.

Application December 26, 1931, Serial No. 583,389

5 Claims. (Cl. 221—73.5)

My invention relates to pressure fluid supply system and apparatus for use in charging fluid under pressure into a container from a supply tank or other source. My improved system and apparatus is of general use where a container is to be suplied with a charge of fluid under a certain desired pressure or where a desired pressure is desired to be accurately maintained in a container. The invention is of particular utility in the automotive field for the accurate inflation of tires of automotive vehicles.

With balloon tires now almost universally used, it is very important that the pressure therein be accurately maintained in order that the tires may cooperate in giving the desired riding qualities to the vehicle to which they are applied. Frequently, very little over-inflation or under-inflation may materially interfere with the proper and desirable riding qualities of the vehicle. There are a number of systems in use at the present time for the inflation of tires but such systems are not sufficiently accurate or reliable and soon get out of order, and usually, to be sure that there has been proper inflation, a person must resort to the application of a hand pressure gage to check up on the pressure delivered by the inflation system.

An important object of my invention is therefore to produce a simple, compact system and apparatus which will accurately and reliably automatically operate to the end that a tire applied to the system will have a charge of air therein under a pressure which is the actual pressure desired and which will agree with the pressure indicated on the indicating means when setting of the system was made for the desired pressure.

It quite frequently happens that a person believes a tire to be under-inflated when, as a matter of fact, it is over-inflated, but, with the systems in use at the present time, no indication will be given of such over-inflation nor will such over-inflation be properly taken care of and the pressure properly reduced. Another important object of my invention is, therefore, to provide a system which, upon application of an over-inflated tire thereto, will automatically relieve the pressure until it reaches the desired pressure for which setting is made on the apparatus. My improved system therefore not only automatically re-inflates an applied tire to the desired pressure but will also automatically cause deflation of an over-inflated tire to the proper desired pressure.

Still another object is to provide a system in which an applied under-inflated tire is first automatically inflated slightly beyond the desired set-for pressure and is then automatically relieved of air until the desired pressure is reached, this procedure more accurately insuring the proper amount of air in the tire when removed from the system.

Another object is to produce a system in which the air flow is not pulsating but is continuous and under proper restriction so as to eliminate inertia overthrow of operating parts, but with the parts moving comparatively slowly but accurately to their controlling positions.

Still another important object is to produce a system which will operate accurately and efficiently independently of large excess pressure in the pressure supply source or tank, and which will operate accurately and efficiently even though the source pressure is only slightly greater than the pressure for which setting has been made.

Still a further object of the invention is to provide means in the system for automatically indicating a leak in the air delivery line, or a leak in the tire applied to the system for inflation.

Another object is to provide cooperating pneumatic means one of which is subjected to the set-up pressure and the other of which is subjected to the pressure delivered to a tire or other container, the unbalancing or balancing condition of the pneumatic means determining the operation of electromagnetic means which control valve structure for regulating the flow of air.

The above enumerated and other features of my invention are incorporated in the structures disclosed on the drawing, which drawing more or less diagramatically illustrates the various operating elements of the system and their electrical and pneumatic interconnection.

On the system shown 1 represents a source of fluid under pressure as for example a compressor or compressed air tank. The source is connected by a conductor 2 with the inlet chamber 3 of a valve structure 4, a port 5 being interposed between the inlet chamber and the outlet or valve chamber 6. A valve 7 in the valve chamber is normally held by a spring 8 against the port to close the same, the valve stem 9 extending upwardly through a plug or head 10 to the exterior of the valve structure. The valve or outlet chamber is connected by a conductor 11 with the chamber 12 in a valve structure 13, a port 14 connecting the chamber 12 with the relief chamber 15 which opens to the atmosphere through a restricted jet 16. The valve 17 in the chamber 12 is normally held by a spring 18 in position to close the port 14 and the stem 19 extends from the valve through a plug or head 20 to the exterior of the valve structure. Above the valve structure is provided an operating lever 21 therefor pivoted at 22 with its ends 23 and 25 above the valve stems 9 and 19 respectively, so that swing of the lever toward the left will depress the stem 9 and the valve 7 to open the port 5, and swing of the lever toward the right will depress the stem 19 and the valve 17 to open the port 14. The valve structure 4 constitutes an inlet valve and the structure 13 constitutes a relief valve for the pressure setting mechanism which will now be described.

This setting mechanism comprises a structure 26 providing the pressure chamber 27 and a gauge 28. A conductor 29 connects the valve chamber 12 of the relief valve structure 13 with the chamber 27 and a branch conductor 30 leads from the conductor 29 to the gauge, the gauge being preferably of the Bourdon type whose construction is well understood in the art.

The structure 26 has the opening 31 in its lower wall 32 exposed to the atmosphere and arching over this opening and secured at its edges to the wall 32 is a pressure responsive device 33 which may be in the form of a bellows whose wall 34 is secured to one end of a stem 35 which extends axially through the bellows and through the atmosphere opening 31. The inner side of the bellows is thus exposed to atmosphere pressure while the outer side is exposed to the pressure within the chamber 27. To set the mechanism thus far described for a desired pressure, the valve operating lever 21 is swung to the left to open the valve 7 for the flow of fluid from the source 1 through the conductor 2, port 5, chamber 6, conductor 11, valve chamber 12, and through conductor 29 to the chamber 27 and the gauge 28. When the gauge indicates the pressure desired, the valve lever 21 is released so that the spring 8 may close the valve 7 against further flow of fluid from the source. In order to retard the flow of the fluid so that the gauge needle will not be violently actuated and so that the bellows 33 will be gradually subjected to pressure, I preferably interpose a reducing jet 36 which jet may be inserted between the outlet pipe 2 from the supply source and the chamber 3 of the valve structure 4. The gauge needle can thus be slowly and accurately brought to the desired indication and should too much air be accidentally allowed to flow, the pressure may be slowly brought back by swinging the valve lever 21 toward the right to open the relief valve 17 so that the pressure can be slowly reduced through the restricted jet 16. Thus, setting can be accurately made for the desired pressure in the container to be supplied, the gauge needle moving slowly to the proper indication for the desired pressure. The bellows chamber 27 is now filled with air under the pressure corresponding to that which it is desired to deliver to the container such as a tire. Under the influence of such pressure in chamber 27 the bellows 33 is contracted and the stem 35 is shifted outwardly. The shifting movement of such stem is utilized for operating mechanism which will control the connection of the supply source with the container to be supplied.

The flow of fluid to the container is controlled by a valve structure 37 whose inlet chamber 38 is connected by a conductor 39 with the outlet pipe 2 of the supply source 1. A port 40 intervenes between the inlet chamber 38 and the outlet chamber 41 of the valve structure 37, a valve 42 in the chamber 41 being normally held by a spring 43 to close the port 40, the valve stem 44 extending upwardly through a plug or head 45 terminating in an abutment 46. The outlet pipe 47 from the outlet chamber 41 of the valve structure 37 has connection with a flexible conductor, such as a hose 48, which terminates in a chuck or fitting 49 for application to the valve stem of a tire, when the system is to be used for tire inflation. The operation of the valve structure 37 is preferably electromagnetically accomplished, the circuit for the electromagnetic means being controlled by the movement of the stem 35. The electromagnetic operating means for the valve structure 37 is shown in the form of an electromagnet structure 50 having an armature lever 51 pivoted at one end as indicated at 52, the outer end of the armature lever terminating above the abutment 46 on the stem of the valve structure 37 so that when the electromagnet 50 is energized, the armature lever will be swung to cause the depression of the valve stem and opening of the valve 42 for the flow of fluid from the supply source 1 to the supply hose 48.

Secured to the stem 35 of the bellows 33 is a collar 53 having a pin 54 extending therefrom into the crotch end of a lever 55 pivoted near the crotch end on a pivot pin 56. The outer end 57 of the lever is insulated by insulating material 58 from the inner end of the lever and carries a contact 59 adapted for engagement with a contact 60 adjustable in a holder 61. A source of current 62 has one terminal connected by a conductor 63 with the lever end 57, the other terminal of the source being connected by a conductor 64 with one terminal of the winding of the electromagnet 50, the other terminal of the winding being connected by a conductor 65 with the contact holder 61. With this arrangement, when the bellows 33 responds to pressure in chamber 27 and the stem 35 is shifted downwardly the lever 55 will be swung upwardly to carry its contact 59 into engagement with the contact 60 to close the circuit from the source 62 to the electromagnet 50 and upon attraction of the armature lever 51, the valve 37 will be automatically opened for the flow of fluid from the supply source 1 to the delivery hose 48. Upon application of the delivery hose to the receiver, such as a tire, fluid under pressure will be delivered from the supply source for inflation.

The means for shutting off the air flow when the predetermined and desired pressure is reached in the tire or other receiver comprises a bellows structure 66 which acts in opposition to the bellows structure 33. The bellows structure 66 is contained within a frame 67 providing a pressure chamber 68, the wall 69 having the opening 70 exposed to the atmosphere, the bellows 66 arching over this opening and having its wall 71 connected to the other end of the stem 35, the stem extending concentrically through the bellows 66. The conductor 47 leading from the valve structure 37 connects with conductor 72 leading to the pressure chamber 68 around the bellows 66 and when the valve 37 is opened for the flow of air to the receiver, air will also flow into the chamber 68 to build up pressure therein for counteracting the pressure in the chamber 27. The flow of air to the chamber 68 is preferably restricted as by means of a restricting jet or plug 73 interposed in the conductor 72 and while the receiver is being filled the pressure in chamber 68 gradually rises to act on the bellows 66 and when the pressure becomes sufficient to overcome the pressure against the bellows 33, the stem 35 will be shifted to cause swing of the lever 55 to separate its contact 59 from the contact 60 so that the circuit for the electromagnet 50 is opened and its armature 51 released in order that the spring 43 of valve structure 37 may shift the valve 42 to close the port 40 and shut off further flow of fluid from the supply source 1 to the receiver. Upon closure of the port 40 the air flow to the bellows chamber 68 will also stop and the bellows structure 33 and 66 then counterbalance each other and are in their neutral position.

For relieving a tire which is already over-inflated when applied to the system, a relief valve structure 74 is provided. This valve structure is shown applied with its valve chamber 75 interposed in the conductor 47 leading from the inflation controlling valve structure 37. The valve chamber 75 is separated by a port 76 from the outlet chamber 77, a reducing jet 78 being preferably included in the outlet. A spring 79 normally holds a valve 80 to close the port 76 and the valve stem 81 extends through the plug or head 82 and terminates in an abutment 83. The valve is controlled by an electromagnet structure 84 whose armature 85 is pivoted as indicated at 86 with its end above the abutment 83 of the valve stem 81 so that when the electromagnet is energized the armature lever will depress the valve stem to cause opening of the valve 80 and thereby connection of the valve chamber 75 and consequently the delivery hose 48 with the outlet chamber 77 of the valve structure 74 which communicates with the atmosphere through the restricted jet 78.

For controlling the current flow through the electromagnet 84 the contact 87 is supported in a holder 88 which is connected by conductor 89 with one terminal of the electromagnet 84 whose other terminal connects with a terminal of the current source 62. The contact 87 is in the path of the contact 59 on the lever end 57 and when the contacts are in engagement current flows from the source 62 through the conductor 63, lever end 57, contacts 59 and 87, and conductor 89 and through the winding of the electromagnet back to the source.

Suppose now that a tire is believed to be under-inflated, but which as a matter of fact, is already over-inflated, setting is made on the system in the manner described, the lever 21 being manipulated to bring the gauge needle to indicate the desired pressure, the bellows 33 then responding to shift the stem 35 and swing the lever 55 for closure of contacts 59 and 60 and operation of electromagnet 50 to open the valve structure 37, the fluid under pressure then flowing through the valve structure 37 into the delivery hose 48 whose chuck 49 is usually provided with a check valve. Air also flows through the restricted jet 73 into chamber 68 and the bellows 66 is actuated to oppose the bellows 33 and to cause swing of the switch lever to disconnect contacts 59 and 60 so that the valve 37 is reclosed. Now when the hose chuck is applied to the tire in which the pressure is greater than the desired pressure, which now is the pressure in the bellows chambers, air will flow from the tire, this air flowing primarily through the conductor 72 and jet 73 to the bellows chamber 68 and owing to the increased pressure in this chamber the bellows 66 will shift the stem 35 to cause downward swing of the switch lever and engagement of its contact 59 with the contact 87 to close the circuit for the electromagnet 84. The resulting attraction of the armature lever 85 will cause opening of the valve structure 74 and then the excess pressure will be relieved from the tire and from the bellows chamber 68 through the jet 78. In order that the bellows chamber 68 may be quickly relieved, the jet 73 is shunted by a check valve structure 90. The jet plug 73 is seated in the frame of the valve structure 90 and in the valve chamber 91 is the valve 92 which is normally held by a spring 93 to close the port 94 connecting with the conductors 72 on the bellows chamber side of the jet plug 73, the conductor being connected from the other side of the jet plug to the valve chamber by a passageway 95. The air from the bellows chamber 68 can thus quickly flow past the check valve 92 and to atmosphere through the jet 78, this jet retarding the flow sufficiently so that the tire may not be too far deflated. As soon as the pressure in the bellows chamber 68 equalizes with the pressure in chamber 27, the conjoint action of the bellows 33 and 66 will shift the stem 35 to swing the switch lever 55 to neutral position and thereby disconnect the contact 59 from contact 87 to cause opening of the circuit of electromagnet 84 whereupon the relief valve 74 is reclosed. The pressure in the tire is now the desired pressure for which setting was made.

When the system is used for tire inflation, the arrangement is preferably such that an applied tire will be inflated slightly beyond the desired pressure and then relieved to the desired pressure in order to more positively assure that the tire when removed from the system will have the full desired pressure. This is accomplished by a proper calibration of the jet 73 which regulates the air flow to the bellows chamber 68, the calibration being such that the tire will be slightly over-inflated and the pressure in the bellows chamber 68 sufficiently greater than the pressure in the bellows chamber 27 so that bellows stem 35 is moved beyond its normal position, whereby after opening of the circuit for electromagnet 50 and closure of the valve structure 37 the circuit for electromagnet 84 will be closed and the valve structure 74 opened. Air will now flow from the tire and from the bellows chamber 68 to atmosphere through the jet 78, the air from the bellows chamber flowing practically unrestricted through the check valve structure 90, and as soon as the bellows 33 and 66 resume their normal position the switch lever will reach neutral position and the circuit of electromagnet 84 will be opened and the relief valve 74 will be reclosed, the tire then having the desired and set-up pressure therein. To indicate that the operation has been completed, an audible or a visible signal may be provided. I have shown a bell 96 in the path of a striker arm 97 extending from the armature 85 of electromagnet 84 so that when the armature is released the bell will be struck and sounded.

After an operation of the system the pressures in the bellows chambers 27 and 68 are substantially equal. If, for the next use of the system, the desired pressure is the same as that indicated on the gauge, the delivery hose is merely applied to the tire. If the pressure in the tire is less than the gauge indication, then the air will flow from the bellows chamber 68 into the tire on account of the lower pressure in the tire, and this unbalance of the bellows structures will cause the switch lever to swing to close the circuit for electromagnet 50 and the delivery valve 37 will be opened for the flow of air to the tire, and after a slight over-inflation the electromagnet 84 will be connected in circuit for opening of the relief valve 74 and the tire is relieved to the desired pressure and the bellows chamber 68 is relieved until the pressure falls to the pressure in the bellows chamber 27.

If the gauge does not indicate the pressure desired, then the valve lever 21 is manipulated until the desired pressure is indicated. If the manipulation is such that more air is admitted to the bellows chamber 27, the bellows stem 35 will be shifted to swing the switch lever to close the circuit for the electromagnet 50 so that the delivery valve 37 is opened and the tire will then receive air and the air flow to the bellows chamber 68 will eventually cause shift of the bellows stem and swing of the switch lever for closure of the delivery valve 37 and opening of the relief valve, whereupon the slightly over-inflated tire will be relieved to the set pressure, the bellows being at the same time neutralized and the switch lever moved back to neutral or normal position.

Had the manipulation of the valve controlling lever 21 been such that air had been relieved from the bellows chamber 27, then the predominating pressure in the bellows chamber 68 would first cause shift of the valve stem and swing of the switch lever for controlling the electromagnet 84 to open the relief valve 74 for relief of the bellows chamber 68 and consequent movement of the bellows 33 and stem 35 to swing the switch lever to reclose the relief valve 74 and open the delivery valve 37 for flow of air to the tire.

The user of the system could also first swing the valve controlling lever 21 to open the relief valve 13 for entire relief of the bellows chamber 27 and movement of the gauge back to zero. This operation would cause the bellows 66 to practically immediately shift the switch lever for operation of the electromagnet 84 and opening of the relief valve 74 for full relief of the bellows chamber 68 to atmosphere pressure and the bellows will then be neutralized and the switch lever would be in neutral position. The lever 21 would then be manipulated until the gauge indicated the desired pressure, which pressure would then also be in the bellows chamber 27 and the operation of the system would then proceed in the manner which has already been explained.

The expanding and contracting movements of the bellows are preferably made comparatively small so that the bellows will be relieved from undue strains and their life will be prolonged. I have shown adjustable stops 98 and 99 for the ends of the bellows stem 35. To obtain sufficient movement for the switch lever contact 59 for proper opening and closure of the respective circuits, the lever is made comparatively long and pivoted close to its end which engages with the pin 54 on the bellows stem. The slight movement of the stem will therefore be multiplied for the proper movement of the contact 59.

I also preferably provide means for causing quick closure and opening movements of the contact 59. This may be readily accomplished by means of permanent magnets 100 and 101 placed at opposite sides of the switch lever end 57, which end will be of magnetic material. The magnet 100 is shown at one side of the lever end adjacent the contact 60 and the magnet 101 is placed at the other side of the lever end adjacent to the contact 87. The magnets are of comparatively small capacity and with just sufficient pull so that when the lever end 57 approaches the magnet poles, the magnetic pull will cause a rapid final movement of the lever and quick engagement of its contact 59 with the respective circuit contact. When the lever is now swung in the opposite direction, the pull or drag of the magnet will serve to momentarily retard the swing of the lever by the bellows action so that when the bellows force finally overcome the magnetic drag the lever will be quickly swung to effect quick break between the contact 59 and the respective circuit contact. On account of the leverage introduced by the switch lever the small pull of the magnet is sufficient to momentarily resist movement of the lever by the bellows action. Arcing is thus reduced to a minimum and rapid deterioration of the contacts avoided.

If there is any leak in the system or a tire applied thereto through which the bellows chamber 68 could relieve independently of the relief valve 74, the system will give indication. The delivery hose 48 is usually subjected to the greatest wear and tear and a leak may occur. To test for the leak the bellows chambers may be first relieved of pressure by manual opening of the relief valve 13 followed by the automatic opening of the relief valve 74, and then a pressure is set up in the chamber 27 which results in operation of the switch and opening of the delivery valve 37 for the flow of air into the delivery hose and into the bellows chamber 68. The pressure in the chamber builds up until the bellows 33 is overcome and the switch lever is moved to connect in the electromagnet 84 to cause opening of the relief valve 74 and pressure will be relieved from the delivery hose and from the chamber until the switch lever is moved back to normal position and the relief valve 74 is closed. If now there is a leak in the delivery hose the chamber 68 will continue to lose pressure and the bellows 33 again predominates and causes closure of the circuit for the electromagnet 50 and the delivery valve 37 is reopened and the same cycle follows. After each closure of the relief valve 74 the bell 96 is sounded. If the bell sounds only once the operator knows that the system is in good order. However, if the bell is again sounded, the operator knows that there is a leak somewhere in the system through which the bellows chamber 68 loses pressure independently of the relief valve 74.

If a tire is applied to the system and there is no leak either in the system or in the tire the bell will be sounded only once. However, if the system has been tested out and found to be leakproof, but the bell continues to sound, then it is an indication that there is a leak in the tire. The user of the system can test for such leak by keeping the delivery hose applied to the tire after the bell has sounded once. If there is a leak in the tire, then, after it has been slightly over-inflated and then relieved through the relief valve 74, and the bellows 66 has been contracted to shift the switch lever back to normal, the pressure in the chamber 68 will containue to reduce on account of the leak if the hose chuck 49 is kept applied to the tire after the bell has been sounded. As pressure in chamber 68 falls due to the leak the bellows 33 will again predominate and the switch lever will be swung to reconnect the electromagnet 50 in circuit for opening of the supply valve 37 and the same cycle of operation is repeated and the bell is again struck, and the bell continues to strike so long as the hose is applied to the tire. The leak in the tire is thus indicated. Of course, if the bell continues to ring after the operator disconnects the hose from the tire, it will indicate that there is a leak in the system itself. But if the bell stops, then the user knows that it is the tire that leaks. Of course, if the leak is such that the air will escape therethrough faster than it can be supplied from the supply tank the bellows 56 will never be affected and the supply valve 37 will remain open and failure of the bell to ring will then indicate the large leak.

The delivery line 48 to the receiver, such as a tire, is usually longer than the path 72 to the bellows chamber 68. To compensate for the difference in friction, and to assume that the tire will have been relieved to the predetermined or set-up pressure when the relief valve 74 is closed, the spring 93 is of sufficient strength to cause the valve 92 to offer resistance to the relief flow from the chamber 68 so that the latter part of such flow will include the jet 73. Then, when the pressures in the bellows come to balance and the relief valve is closed, the pressure in the tire will accurately be the desired pressure.

The various operating elements of my improved system are of simple, economical and durable design. So long as the pressure of the fluid at the source of supply, is greater by whatever amount, than the pressure desired to be delivered, the system will effciently and accurately operate, and whether a tire when applied is under or over-inflated it will have the desired supply of air when disconnected from the system. It is evident that the system could be advantageously and efficiently utilized wherever it is desired to establish and maintain a predetermined pressure, whether the fluid under pressure be a gas or a fluid.

I do not desire to be limited to the exact structure, arrangement and operation shown and described, as changes and modifications may be made without departing from the scope of the invention as outlined in the appended claims.

I claim as my invention:

1. In a system adapted to furnish fluid under pressure from a source of supply to a receiver, a valve controlling the flow of fluid from said source to said receiver, a pressure responsive device comprising a movable structure, means controlling the flow of fluid from said source to one part of said device for causing primary movement of said structure in one direction, means under control of said valve for conducting fluid from said source to said device for causing movement of said structure in the opposite direction, electromagnetic actuating means for said valve, and electrical means controlled by the movement of said structure for controlling the operation of said electromagnetic means.

2. In a system adapted to furnish fluid under pressure from a source of supply, a delivery outlet for said system and a valve for controlling the flow of fluid from said source to said outlet whereby fluid under pressure may be delivered to a container connected with the outlet, fluid pressure controlled means comprising a movable element, means for subjecting said movable element to a setting up fluid pressure proportional to the pressure to which it is desired to charge a container connected with the system outlet, said set up pressure tending to move said movable element in one direction, means for subjecting said movable element to the pressure of fluid delivered to the container, said latter pressure tending to cause movement in the opposite direction of said movable element, a relief valve for relieving pressure from the container, actuating means for said supply and relief valves controlled by movement of said movable element, means whereby primary movement of said element under the set up pressure causes operation of said actuating means to open said supply valve for flow of fluid to the container and to said movable element for opposite movement of said movable element and actuation of said actuating means to reclose said supply valve, and means whereby continued movement of said movable element in the opposite direction will cause operation of said actuating means to open said relief valve, and means for causing closure of said relief valve after relief of said opposing pressure to the desired pressure in said container.

3. In a system adapted to furnish fluid under pressure from a source of supply, a fluid supply valve controlling the flow of fluid from said source to a container to be charged, a relief valve for relieving a connected container of pressure, a fluid pressure operable device comprising a movable element, means setting up a predetermined fluid pressure in said pressure operable device tending to move said movable member in one direction, means subjecting said device to the pressure of the fluid delivered to the container tending to cause opposite movement of said movable member, means controlled by the movement of said movable member by the set up pressure for opening said supply valve, means controlled by the movement of said movable member when the opposing fluid pressure equals the set up pressure for causing closure of said supply valve, and means controlled by the further movement of said movable member in opposite direction for causing opening of said relief valve, and means whereby the resulting relief of the opposing pressure will cause movement of the movable member to neutral position to close the relief valve when the pressure of the delivered fluid equals the set up fluid pressure in said device.

4. In a system for charging a receiver with compressed fluid from a source of supply, a delivery conduit for conducting fluid from said source to a receiver, a valve in said conduit, a pressure operable device, means controlling the flow of fluid from said source to said device for setting up a pressure therein corresponding to the pressure desired to be delivered to said receiver and said set up pressure tending to move said device in one direction, actuating means controlled by the movement of said device in response to said set up pressure for causing opening of said valve, connecting means connecting said device for flow of air thereto from said delivery conduit for setting up counter pressure in said device for opposing the set up pressure therein, balancing of said set up pressure by the counter pressure causing said device to operate said actuating means to close said delivery valve, regulating means in said connection for regulating the flow of fluid to said device relative to the flow to a receiver for retarding the balancing movement of said device and to permit pressure in the receiver in excess of the predetermined pressure, said excess pressure, after closure of said delivery valve causing continued movement of said device in the opposite direction, a relief valve, actuating means for said relief valve controlled by such reverse movement of said device to cause opening of said relief valve and relief of excess pressure from the receiver and from said device, and means whereby said relief of said device will cause reclosure of said relief valve when the pressure in the receiver becomes equal to the predetermined pressure.

5. In a system adapted to deliver fluid under pressure from a source of supply, a delivery valve controlling the flow from said source to the delivery end of said system, a relief valve connected with the delivery end of said system, a pressure operable device, means for controlling flow of fluid from said source to said device for setting up pressure therein corresponding to the pressure of the volume of fluid desired to be delivered, means connecting said device with the delivery end of said system for subjecting it to counter pressure, means under control of said device for causing opening of said delivery valve when the set up pressure predominates and for closing said valve and opening the relief valve when the counter pressure predominates, means regulating the flow of counter pressure fluid to said device to permit the delivery pressure to exceed the set up pressure before said delivery valve is closed, such excess pressure causing the counter pressure to predominate to cause opening of said relief valve, and means whereby opening of said relief valve will cause balance of pressure in said device and closure of said relief valve when the delivered pressure has been reduced to equal the set up pressure.

MAX H. SUSSIN.